April 3, 1956          E. W. HOWARD          2,740,750
METHOD AND APPARATUS FOR FLUIDIZED CATALYTIC CONVERSION
Filed July 21, 1951          2 Sheets-Sheet 2
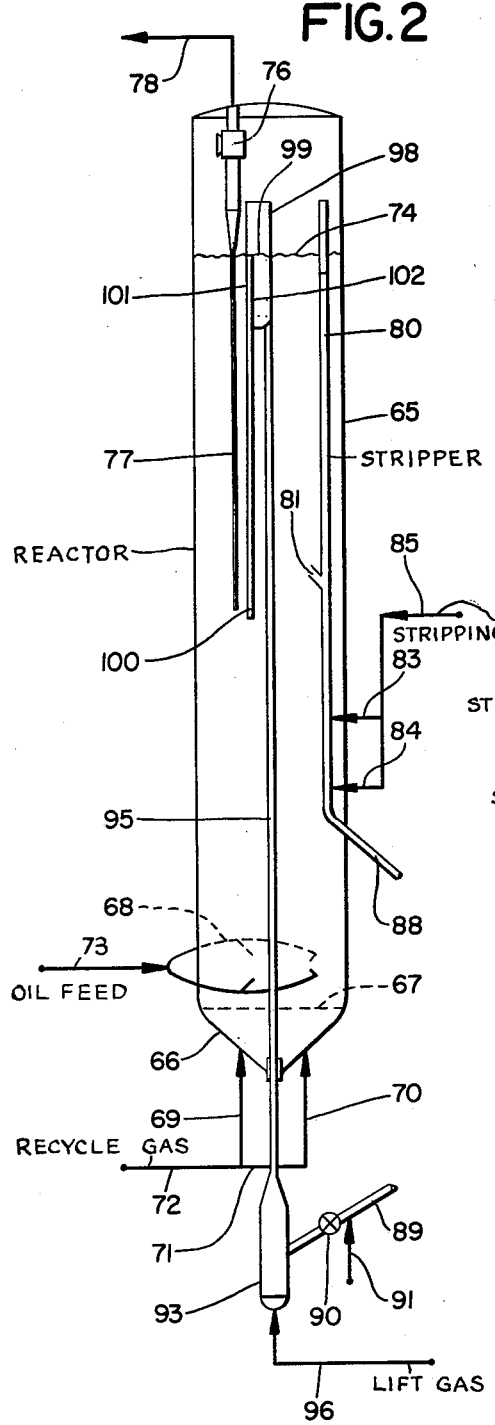
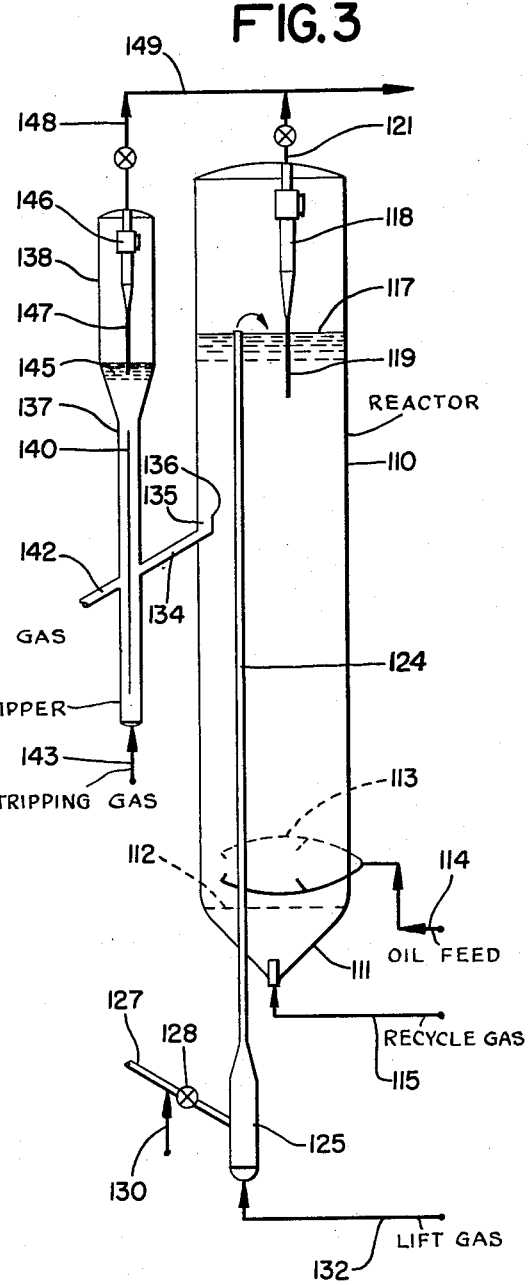
*INVENTOR.*
EVERETT W. HOWARD
BY E. F. Liebrecht
G. H. Palmer
T. C. Virgil
         ATTORNEY.

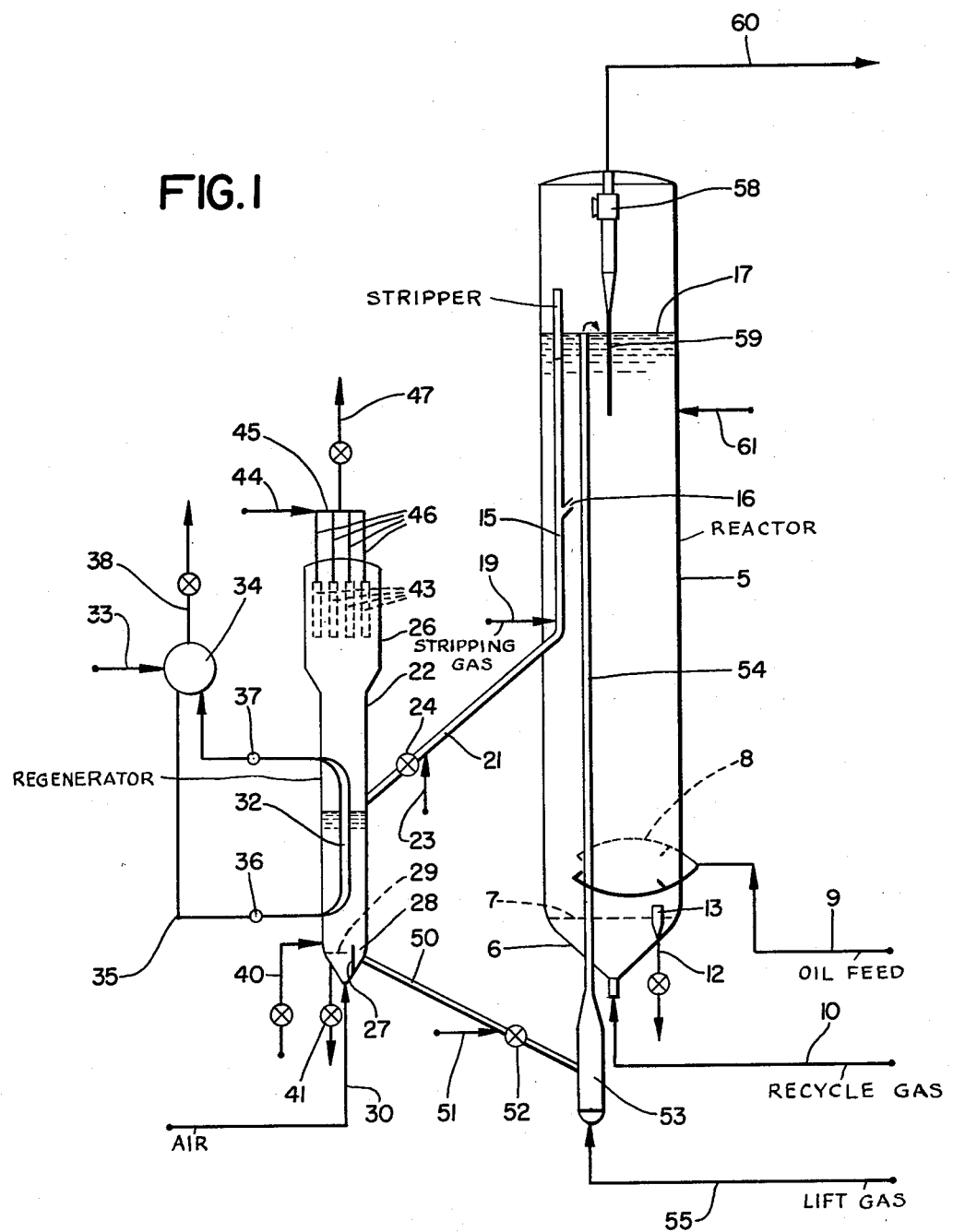

2,740,750

METHOD AND APPARATUS FOR FLUIDIZED CATALYTIC CONVERSION

Everett W. Howard, Glen Rock, N. J., assignor to M. W. Kellogg Company, Jersey City, N. J., a corporation of Delaware Application July 21, 1951, Serial No. 237,911

13 Claims. (Cl. 196—50)

This invention relates to improvements in fluid systems, and more particularly pertains to improved methods and means for catalytically reforming a naphtha stock of low octane quality.

One object of my invention is to provide improved methods and means for fluid systems pertaining to chemical conversion.

Another object of my invention is to provide improved methods and means for hydrocarbon conversion systems.

Still another object of my invention is to provide improved methods and means for fluid hydroforming of a petroleum naphtha stock of low octane quality.

Other objects and advantages of my invention will become apparent as the description and explanation of my invention proceeds.

The improvements of my invention are adapted to a system wherein a gaseous reactant is contacted with a mass of finely divided catalytic solids in a reaction zone, solids are withdrawn from the reaction zone and passed to a regeneration zone wherein any contaminating deposits on the solids resulting from the aforesaid reaction are burned, and the regenerated solids are then passed upwardly in an elongated confined zone by means of a gas and thereby introduced into the reaction zone.

The improved method and apparatus of my invention can be conveniently illustrated with respect to fluid hydroforming of a petroleum naphtha. However, it should be understood that these improvements are also applicable to hydrocarbon conversion, e. g., fluid catalytic cracking, cracking under hydrogen pressure, etc.; isoforming; desulphurization; hydrogenation; dehydrogenation; hydrogenation of carbon oxides; etc.

With reference to the drawings which form a part of this specification:

Figure 1 is a schematic flow diagram of one specific embodiment of a fluid hydroforming system;

Figure 2 is a schematic flow diagram illustrating an improved method and means of transferring regenerated catalyst to a reaction zone; and Figure 3 is another illustration of a system for fluid hydroforming wherein an external stripper is employed.

For catalytic reforming of hydrocarbon stocks the catalyst employed includes a metal of groups 4, 5 and 6 of the periodic system, preferably in the form of oxides. These metals are, for example, chromium, molybdenum, tungsten, titanium, cerium, thorium, etc. These metals are used as such or in the form of oxides and can be used alone or on various supports, such as for example, magnesia, alumina, silica, or combinations of the foregoing, such as for example, silica-alumina, silica-magnesia, etc. A catalyst which is widely used is molybdenum oxide impregnated on "activated alumina" or alumina gel, in the amount of about 1 to 25% based on the weight of the total catalyst. Another effective hydroforming catalyst is platinum or palladium supported on alumina. For the purpose hereunder this catalyst is used in the form of a finely divided powder having particle sizes in the order of about 5 to 150 microns, preferably about 10 to 80 microns. This catalyst forms a fluid bed by maintaining a reactant gas superficial linear velocity in the order of about 0.1 to 6 feet per second therethrough. This gas flow rate is measured as a superficial linear velocity, that is, the velocity of the gas passing through a vessel without any other materials present therein. The preferred superficial linear velocity is in the order of about 0.5 to 2 feet per second.

The reactant materials in contact with the catalyst are the naphtha oil feed and hydrogen. Conveniently, the oil feed rate is expressed as a weight space velocity which is the weight rate of oil feed in pounds per hour per pound of catalyst in the reaction zone. For the hydroforming reaction the space velocity is generally about 0.1 to 15, preferably about 0.5 to 5. On the other hand, the amount of hydrogen employed in hydroforming is defined as the standard cubic feet of hydrogen per barrel of oil feed (the barrel of oil feed is measured as 42 gallons). Generally, hydrogen is employed at the rate of about 1000 to 10,000, preferably about 1000 to 5000 standard cubic feet per barrel of oil feed.

The temperature at which the hydroforming reaction is conducted is ordinarily in the order of about 850° F. and may be varied up to about 1075° F. At these temperatures, the pressure may be varied in the range of from about 30 to 1000 p. s. i. g., preferably about 50 to 500 p. s. i. g.

In Figure 1, vessel 5 is a vertical cylindrical body having a straight side length of about 65 feet and an internal diameter, including an insulating lining, of about 6½ feet. The bottom of vessel 5 is a hollow conical section 6. Inside the bottom part of the reactor, there is situated a circular grid plate 7 at about the place where the straight sides of the vessel are joined with the conical section. This grid plate serves to distribute uniformly the gaseous materials which are introduced into the bottom of the reactor. Ordinarily, the size of openings in the grid plate and the number of these openings will effect a pressure drop in the range of about 0.1 to about 1 p. s. i. A fluid mass of finely divided solids is maintained inside the reactor above the grid plate in order to obtain an intimate contact between the solids and the gaseous reactants. This fluid mass is obtained by passing gaseous materials through a mass of catalytic solids at a superficial linear velocity of about 0.1 to 6 feet per second. Such a fluidized mass has properties closely akin to a liquid, because it exerts a fluistatic pressure, flows, etc. It should be understood that linear velocity is superficial, in that it is measured as the rate of gases which flows through the reactor without any other materials being present therein. In this particular example, the gaseous materials flow through the mass of solids at a superficial linear velocity of about 0.85 foot per second. These solids have, for example, a particle size in a range of about 10 to 80 microns, and, under the aforedescribed conditions, produce a density of about 30 pounds per cubic foot. For this operation, the catalyst is, for example, 9% by weight of molybdenum oxide supported on alumina gel. Generally, the superficial linear velocity of the gaseous materials passing through the reactor can be varied to produce densities of about 15 to 80 pounds per cubic foot, or what is commonly known as a dense phase.

The reactant materials which are introduced into vessel 5 comprises naphtha and a recycle gas which contains hydrogen. The naphtha is introduced into the reactor in a vaporous condition through a circular distributor 8 at a level of about 4 to 8 feet above the position of grid plate 7. This distributor 8 is in turn connected to a feed line or feed source 9. The naphtha vapors are introduced into the reactor at a temperature of about 970°

F. Catalytic reforming is an endothermic reaction, and therefore, requires heat to be supplied to the reaction in order to maintain the desired conditions. The heat of reaction can be furnished by a variety of methods, however, in my invention, this heat is furnished by means of a recycle gas which is introduced through a line 10 at the bottom of the conical section 6 of the reactor. The recycle gas can have a temperature ranging from about 900° to 1450° F. In this example, this recycle gas is introduced at a temperature of 1310° F. By reason of the high temperature at which the recycle gas is introduced into the reactor, it is desirable to avoid immediately contacting the naphtha feed with hot recycle gas. The hot recycle gas causes grid plate 7 to be at a higher temperature than the average catalyst bed temperature in the reactor. Therefore, by introducing naphtha vapors at a reasonable distance above grid plate 7, for example, about 4 feet, these naphtha vapors will be contacting a bed of catalyst which is at the desired reaction temperature, for example, 940° F.; and not come into contact with a hot grid plate which might cause an undersirable amount of thermal cracking. Further, the solids in contact with the grid plate pick up the heat and by virtue of the turbulent, circulatory motion of the bed, the particles dissipate the heat to other particles before contacting the naphtha. The recycle gas which supplies a substantial part of the necessary heat of reaction is fed into the reactor at the rate of about 1000 to 10,000 standard cubic feet per barrel of naphtha feed (42 gallons are equal to 1 barrel). Catalyst can be withdrawn from the reactor through a valved line 12 which is connected to a well 13 extending from above the grid plate through the conical section of the reactor.

The naphtha vapors in contact with the fluid bed in the reactor are converted to materials of higher octane rating. This conversion of naphtha also results in the production of a carbonaceous material. This carbonaceous material contaminates the catalytic solids and causes a decrease in catalyst activity. The reduction in catalyst activity is temporary, in that, the activity can be restored by removing the carbonaceous deposit through burning with an oxygen-containing gas. The carbonaceous material is composed of volatile and non-volatile components, and in order that the regeneration requirements of the system can be reduced, it is desirable to subject the catalyst to a stripping treatment to remove volatile material prior to introducing same to a regeneration zone. In this respect, therefore, in Figure 1 an elongated stripper 15 having an internal diameter of about 8 inches extends vertically along the inside wall of the reactor from a level of about 15 feet above grid plate 7. This stripper is about 40 feet in length and contains an inlet or opening 16 of about 5 to 15 square inches in area. The stripper inlet is located about 30 feet above the grid plate 7. Catalyst is withdrawn from the reactor through the inlet 16 of the stripper at a rate of about 7800 pounds per hour. The catalyst rate of circulation and the oil feed rate represent a catalyst-oil ratio of about 0.35 for this example. Generally, this catalyst-oil ratio will vary from about .05 to 10. The upper end of the stripper extends above the bed level 17 of catalyst in the reactor in order to avoid any commingling of stripped products with the catalyst in the reaction zone. If the stripped products are allowed to commingle with the catalyst in the reaction zone there is a reduction in stripping efficiency, because part of the volatile carbonaceous materials which are separated from the catalyst in the stripping zone will be again deposited on the catalyst in the reaction zone. Furthermore, if the stripped products are passed into the reaction zone, this will adversely affect the reaction by reason of the reduction in partial pressure of the reactant materials. In the stripping zone, the spent or contaminated catalyst which is withdrawn from the reactor is contacted with a stripping gas, such as for example, steam, flue gas, nitrogen, carbon dioxide, air, recycle gas, etc. For this operation, it is preferred to use steam at a rate of about 50 to 500 pounds per hour, or specifically, about 332 pounds per hour. This stripping gas is charged into the bottom of the stripper by means of a line 19.

The stripped solids flow countercurrently to the stripping gas and then flow from the stripper into a spent catalyst transfer line or standpipe 21. This transfer line is a 2 inch pipe which connects the stripper to a regeneration zone. The catalyst in the standpipe is in a fluidized condition in order that it may readily flow into such a zone. Ordinarily, the density of this stream is maintained at about 15 to 50 pounds per cubic foot. In order to maintain a fluid condition, an aeration gas such as for example, steam, flue gas, air, nitrogen, carbon dioxide, is introduced through line 23 at a point above the position of slide valve 24 of the standpipe. This slide valve serves to automatically control the rate of flow of spent solids into the regenerator. As a result of the fluistatic pressure which is developed in the standpipe and stripper, the total pressure existing just above slide valve 24 is about 258 p. s. i. g. The pressure existing in the top of the reactor is about 250 p. s. i. g. The catalyst flowing through the slide valve will undergo a pressure drop in the order of about 4½ p. s. i. These pressure conditions are sufficient to maintain a catalyst flow rate of about 7800 pounds per hour.

The stripper illustrated in Figure 1 represents a unique apparatus for effecting the stripping of catalyst in a system of the kind under consideration. This stripper possesses many advantages over other kinds of apparatus employed for the same purposes. The stripper is compact and lends easily to installation within the reactor without interfering with process conditions. Furthermore, the stripper is designed to give a high $L/D$ ratio, wherein L is the length of the stripper and D is the average diameter, and such a ratio favors effective stripping. By installing a stripper within the reactor construction costs are reduced substantially, because it is not necessary to erect a separate support structure for the stripping vessel alone. Furthermore, this type of an arrangement eliminates the need for a transfer line to convey the catalyst from the reaction zone to the stripping zone. Still further, this apparatus does not require any auxiliary heat to maintain the temperature within the stripper at a desired level, because it is surrounded by the reactor bed.

The regenerator is a vertical cylindrical vessel having a lower portion 22 which is about 2 feet 3 inches in diameter (including insulating lining) and 22 feet long. This lower section is connected to an enlarged section 26 which has a diameter of about 4½ feet (including the lining) and is 4⅓ feet long. Inside the bottom of the regenerator, which is conical in shape, a vertical transverse baffle 27 forms a well 28 through which regenerated catalyst flows from this zone. A grid plate 29 covers the cross-section of the bottom of this regenerator just above the conical section. This grid plate serves the same purpose as in the reactor and that is, it will cause the incoming gases which are introduced at the bottom of the regenerator to be distributed uniformly over the cross-section of the vessel. At the bottom of the regenerator below the grid plate, oxygen-containing gas is introduced through a line 30. This oxygen-containing gas is, for example, air, which will be used to burn the carbonaceous deposits on the catalyst entering the regenerator. The air supply in line 30 exists at a low temperature, for example, about 140° F., in order to assist in reducing the amount of heat which must be removed from the regeneration zone. The amount of air used for regeneration will depend on the rate at which the carbonaceous material is deposited on the catalyst in the reaction zone. Ordinarily, about 15 pounds of air per pound of carbonaceous material are used for this purpose. This quantity of air will have a superficial linear gas velocity of about 0.1 to 6 feet per second and maintain a dense phase in the regenerator. In this example, the superficial linear velocity in the regenerator is 0.45 foot per second. As a result, the density of the catalyst in the regenerator is 36 pounds per cubic foot. However, this density can vary from about 15 to 80 pounds per cubic foot, or generally, a dense bed of catalyst is used in the regenerator. The temperature of regeneration is maintained from about 750° to 1250° F., or, for example, at 1100° F. The amount of heat which is liberated in the regeneration vessel is usually greater than what is dissipated through heat loss, etc., consequently, the temperature of the regenerated catalyst will rise to an undesirable level unless heat is removed. This is accomplished by means of a plurality of vertical tubes 32 disposed within the regenerator. Cooling is effected by passing water through a supply line 33 into a boiler drum 34, and thence leaves the drum through a line 35 which is connected to the tubes through a common header 36. Inside the regenerator, part of the heat which is liberated from burning carbonaceous material vaporizes a portion of the water in the tubes 32 and causes an upward flow of materials to a common header 37. Steam and water which are produced in the tubes are then passed back to the boiler drum wherein the steam is removed by means of an overhead valved line 38, and the remaining water is recirculated through line 35.

The vertical tubes serving as a bed cooler provide a means of automatically controlling the temperature of regeneration. This is accomplished by using vertical tubes of sufficient length so that by varying the height of the catalyst bed in the regenerator, more or less cooling surface is exposed to the catalyst bed. The bed level in the regenerator can be varied by adding or withdrawing catalyst from this zone. This is accomplished, for example, by introducing catalyst through a valved line 40 which is connected to the bottom of the regenerator and withdrawing catalyst through a valved line 41 which is similarly connected. Another method of controlling the height of bed in the regenerator is to vary the rate of oxygen-containing gas which is charged to the bottom of the regenerator. By varying the quantity of this gas, there will be a corresponding change in density of the fluid bed, hence the height of the bed will either rise or fall depending upon the change in the rate of gas. It is preferred to operate the regenerator with a dense bed because of the high heat transfer obtained by such a fluid mass in contact with the cooling tubes.

The passage of gaseous materials from the regenerator is usually accompanied by an entrainment of some catalyst. This effect is partly overcome by providing a disengaging zone of large cross-sectional area above the regenerator proper. In Figure 1, the disengaging zone is section 26 and it contains a larger cross-sectional area than section 22. The increase in cross-sectional area is usually enough so that the exit gases will have a velocity in the order of about 0.1 to 1½ feet per second. Notwithstanding this precaution, in reducing the linear velocity of the gases, there is still a certain amount of catalyst which is carried over in the gas stream. Therefore, to reduce the size of losses which ordinarily might be incurred, plurality of filters 43 are installed in the enlarged section 26 of the regenerator. These filters are designed to retain the solids on the outer surface which are carried upward in the gas stream. The solids, therefore, accumulate on the outer surface of the filters. It becomes necessary, therefore, to periodically remove the solids, otherwise an excessive pressure drop will result. This is accomplished by blowing back the filters at regular periodic intervals by means of a gas such as air which is introduced through a line 44. In the drawing, the air supply line is shown as joining a common header 45 to which the individual filters are connected by means of lines 46. This is schematic and is not intended to illustrate the exact arrangement. The flue gases resulting from the regeneration are discharged from the system through a valved line 47 which is also connected to the common header 45.

The extent of burning of carbonaceous material can be controlled so that the catalyst leaving the regenerator will have a carbonaceous content of about 0 to 0.5% by weight. It is usually preferred to regenerate the catalyst to a 0% carbonaceous content. The catalyst thus regenerated leaves the regeneration system through well 28 which is connected to a regenerator transfer line or standpipe 50. This standpipe contains the catalyst in a fluid condition having a density of about 15 to 50 pounds per cubic foot. In this example, the density of the catalyst in this standpipe is 36 pounds per cubic foot. Any tendency of the catalyst to defluidize is overcome by introducing aeration gas, such as for example, recycle gas, steam, carbon dioxide, flue gas, nitrogen, etc., through line 51. The point of introduction of aeration gas is above the location of a slide valve 52 which is installed in the standpipe as a means of automatically controlling the flow of catalyst therethrough which in turn determines the catalyst level, heat transfer rate and therefore temperature in the regenerator. In this particular example, it is preferred that the aeration gas be a recycle gas which will be described more fully hereinafter. The standpipe 50 is connected to a lift vessel 53 which is located below the conical section of the reactor. This lift vessel contains a diameter of about 18 inches outside diameter and is 5 feet in length. The diameter of the lift vessel is gradually reducced in an upward direction to about 2 inches, at which point it is connected to an elongated vertical conduit or riser 54. The riser extends from the point of connection with the lift vessel outside the reactor, through the entire reactor, and ending at the catalyst bed level 17. Lifting gas is charged to the bottom of the lifting vessel by means of a line 55. In this example, the lifting gas is a hydrogen-containing gas stream which is recovered from the product recovery system (not shown). This recycle gas contains about 40 to 70% by volume of hydrogen and has an average molecular weight in the order of about 10 to 20. In place of recycle gas, pure hydrogen can be used, the only disadvantage residing in the costs of manufacturing pure hydrogen.

The lifting vessel into which the regenerated catalyst flows from the regeneration zone is designed so that the superficial linear gas velocity of the recycle gas is about 0.2 to 2 feet per second, or generally, it is desired to maintain a dense phase of catalyst in the lift vessel. This factor is important for two reasons. One reason is to reduce the linear velocity of the gases at this point in order that erosion of the lift vessel may be minimized substantially. Ordinarily, erosion is greatest at the point at which the direction of travel of the solids is changed abruptly. In this example, the regenerated solids enter the lift vessel at an angle of 120° with the direction of flow of the incoming recycle gas. The erosion at this point would be excessive if the velocity of the recycle gas stream were in the order of about 10 to 50 feet per second. Therefore, by having the lift vessel at the place where the catalyst direction of flow is changed, erosion is substantially overcome. Another reason for having a lift vessel receive the regenerated catalyst prior to charging same into the reactor, concerns the restoration of activity of the catalyst. With hydroforming catalysts, such as for example, molybdenum oxide, either alone or supported on a carrier, it appears that the activity of the catalyst is reduced by virtue of the oxidizing conditions which are present in the regeneration zone. The fall in activity may be continuous, and unless the activity is continuously restored, it may be necessary to replace the low activity catalyst with more active catalyst. The low activity catalyst can be restored to a useful type by subjecting same to a reduction treatment. This can be accomplished by contacting the catalyst with a hydrogen-containing stream at a temperature in the order of about 700° to 1200° F. By means of the present invention, the gradual and continuous decline in catalyst activity is counteracted by contacting the regenerated catalyst with a hydrogen-containing gas. This hydrogen-containing gas stream serves the two-fold purpose of counteracting the decline of catalyst activity and serving as a lifting means for the regenerated catalyst. Therefore in the drawing, the regenerated catalyst which is present in the lifting vessel is carried upwardly through riser 54 by means of the recycle gas. The diameter of the riser is about two inches, so that the recycle gas, which is introduced at a temperature of, for example, 700° F. and at the rate of about 173 standard cubic feet per barrel of oil feed, will have a linear velocity in the riser of about 29.4 feet per second. The superficial linear velocity of the hydrogen-containing gas in this riser can vary from about 5 to 80 feet per second to give a lean or dense phase of catalyst flowing upwardly therein. These velocities are sufficient to carry the solids upwardly through the riser and then discharge into the top of the reaction zone. Ordinarily, the density of the upflowing fluid mass in the riser is about 1 to 25 pounds per cubic foot. The total recycle gas which is charged into the lift vessel by means of line 55 and the quantity which is charged into the bottom of the reactor through line 10, for this example, constitutes about 6000 standard cubic feet per barrel of oil feed. In the drawing, the upper end of the regenerated catalyst riser is shown as being level with the height of the bed in the reactor. This condition can be varied so that the end of the riser is submerged about a foot or two or more below level 17 in order that any jet-like action of the incoming materials is dampened. Another method by which this high velocity effect can be reduced is to increase the cross-sectional area of the end of the riser and thereby reduce the superficial linear velocity of the materials flowing therethrough. The amount of hydrogen, either in the pure form or in admixture with other gaseous materials, used for purposes of counteracting the fall in catalyst activity due to regeneration conditions is about 1000 to 10,000 preferably 1000 to 5000, standard cubic feet per barrel of fresh naphtha feed.

The reaction product formed in the reactor tends to carry therewith catalyst particles. A substantial proportion of the entrained solids are separated in cyclone 58. The separated solids are returned to a point below the top of the reactor bed by means of a dipleg 59; whereas the reaction product leaves the system through an exit line 60. Although a cyclone separator is employed to remove any catalyst which is entrained in the reaction product, it is found that some catalyst still remains in this product stream. Further cleanup of this product stream can be accomplished by oil scrubbing, etc., and a slurry of the recovered catalyst can be returned to the upper part of the reactor through a line 61.

Figure 2 represents a modification of the embodiment illustrated in Figure 1 in which the regenerated catalyst is maintained in contact with the recycle gas for longer periods of time. In this figure, the reactor, stripper and other like elements of the apparatus contain the same relationship and dimensions as given in Figure 1 hereinabove. The reactor 65 is a vertical cylindrical vessel containing a conical shaped bottom 66. A grid plate 67 covers the available flow area of the reactor just above the place of connection of the conical shaped section with the cylindrical portion of the reactor. Naphtha vapors are introduced into the bottom of the reactor through a circular distributor 68 by means of line 73. The entry of the naphtha vapors into the reaction zone is arranged so that the vapors do not contact the grid plate directly. As previously mentioned this arrangement tends to avoid undesirable thermal cracking of the naphtha stock. The grid plate being at a higher temperature than the bed of catalyst in the reactor may cause contacting naphtha vapors to thermally crack and deposit carbonaceous material thereon. This effect is to be avoided, because a hydroforming operation is concerned with the production of materials having a higher octane value and a large concentration of aromatic compounds.

The heat of reaction for the reforming treatment is supplied by means of a recycle gas which is fed into the bottom of the reactor below the grid plate through lines 69 and 70. These recycle gas lines are connected to a common header 71 into which recycle gas is charged from supply line 72. In the reactor, the catalyst is maintained in a fluidized condition in order to provide an intimate contact of reactant gases therewith. The bed level is represented by line 74 and is present in the upper portion of the reactor. The reaction product formed as a result of the reforming operation passes through a cyclone separator 76 in order to recover catalytic solids which are entrained therein. The solids which are separated from the gas stream by means of this cyclone are returned to the reaction zone at a point below the level of catalyst through a dipleg 77. The separated gaseous product leaves the cyclone through an exit line 78 and is charged into a product recovery system which is not shown. The stripper 80 is an elongated vertical cylindrical vessel of substantially reduced cross-sectional area as compared to the reactor. This stripper is disposed along the inside wall of the reactor in a vertical position much in the same way as described in Figure 1. The catalyst in the reactor is withdrawn by flowing through opening or inlet 81 in the stripper. This catalyst is countercurrently contacted with a stripping gas, such as for example, steam which is introduced through lines 83 and 84 at the bottom part of the stripper. The stripping gas inlets are connected to a common header 85 through which the stripping is supplied. The stripped catalyst leaves the bottom of the stripper through a standpipe 88 and is charged into a regenerator which is not shown. After the catalyst is regenerated to a suitable carbonaceous content, it is returned from the regenerator through a standpipe 89 which contains a slide valve 90 for automatically controlling the flow of solids. This standpipe is also connected to a suitable aeration supply line 91 above the position of the slide valve in order to maintain the flowing catalyst in an aerated condition. The regenerated catalyst flowing through standpipe 89 enters a lift vessel 93 which has an enlarged cross-sectional area so that the superficial linear velocity of gases passing therethrough would be about 0.1 to about 2 feet per second. The lift vessel is disposed under the reactor and is connected to a vertical riser 95 which extends through the reactor. This riser contains a reduced cross-sectional area in order that the gases flowing therethrough from the lift vessel may acquire a gas velocity in the order of about 10 to 80 feet per second. The gas employed as a lifting means is a recycle gas which is introduced into the bottom of the lift vessel by means of a line 96. In Figure 1, the riser is shown as an open end pipe of uniform cross-sectional area. In Figure 2, the riser is connected to a holding vessel 98 which is supported within the top portion of the reactor. The cross-sectional area of the holding vessel is about 2 to about 15 times as large as the cross-sectional area of the riser 95. This holding vessel is a vertical cylindrical vessel having a diameter of 18 inches and a length of 10 feet. The velocity of the recycle gas entering the holding vessel is reduced substantially so that a relatively denser phase of catalyst having a level 99 is formed therein. The catalyst holdup in this vessel 88 provides a means of contacting the regenerated catalyst with the recycle gas for a longer period of time. In addition this holding vessel provides means for returning or introducing regenerated catalyst at any point in the reactor bed. The stripper inlet in this example is about 30 feet above the position of the grid plate in the reactor. By means of holding vessel 98, regenerated catalyst is introduced into the reactor bed by means of a vertical depending conduit 100 which terminates at a point about 4 feet below the stripper inlet. This regenerated catalyst inlet line 100 is connected to the bottom of the holding vessel where a well 101 is formed within the holding vessel by means of a vertical transverse baffle 102.

In the catalytic reforming of naphthas, it is found that about two-thirds of the desired conversion of naphtha is accomplished in the first half or the lower half of the bed of catalyst in the reactor. The remaining one-third of the desired conversion must take place in the upper half of the catalyst bed. This condition exists by reason that the fresh naphtha is more susceptible to conversion than the reactant material which has undergone some conversion. Accordingly, the greater the conversion of the naphtha stock, the less the tendency for the converted stock to undergo further conversion. Stated another way, as the naphtha is converted it becomes more refractory to the hydroforming conditions. In order that this refractory material may be given an accelerative effect, it is proposed herein to introduce the regenerated catalyst at a point in the reactor bed where the reaction rate is beginning to diminish at a much faster rate than existed previously. This is advantageous because the regenerated catalyst has a higher activity than the average activity of the catalyst bed and will thus cause the naphtha to be converted more readily. Essentially, therefore, this regenerated catalyst is introduced into the reactor bed at the middle section, or upper section by a shorter suspended inlet line, in order to have the desired accelerative effect on the conversion.

Another significant feature of our invention is that the entrained catalyst which is recovered by means of the cyclone 76 is returned to the reactor bed at about the same level as the regenerated catalyst is introduced. The introduction of the recovered catalyst at this point tends to insure uniformity of particle sizes in the reactor bed, and tends to avoid the undesirable phenomena of the finer catalytic material being recycled from the top of the reactor bed, through the cyclone, and back to the top of the reactor bed. Hence, the main advantage in having the cyclone dipleg terminate at about the point of entry of the regenerated catalyst in the reactor bed is to counteract any tendencies of the catalyst bed to classify, that is, the coarser catalytic particles being concentrated in the lower part of the catalyst bed and the finer catalytic particles accumulating in the upper part of the catalyst bed.

In Figure 2, the level of catalyst in holding vessel 98 is about 4 feet in height. This condition can be varied so that the holding vessel can be substantially larger in volume and therefore hold larger volumes of catalyst therein. Conversely, the catalyst holdup in this vessel 98 can be decreased from what is given in Figure 2. Generally, the volume of catalyst contained in the holding vessel will be regulated so that about 10 to 100, preferably about 30 to 70, standard cubic feet of recycle gas are contacted with each pound of catalyst present therein. If an additional amount of recycle gas is desired, this quantity can be introduced by means of a separate line (not shown) at the bottom of the holding vessel 98. Likewise, if it is found that the naphtha stock is substantially converted by the time it is passed through one-fourth or one-third of the catalyst bed, the regenerated catalyst line 100 can be increased in length so that the regenerated catalyst will be charged at the most effective point in the reactor bed.

Figure 3 illustrates an embodiment of my invention wherein stripping is accomplished by means of a vessel which is located outside of the reaction zone. In this figure, the size and shapes of the reactor, lift vessel, naphtha feed distributor and grid plate are essentially the same as given in Figure 1 above. In this figure, the reactor 110 is a vertical cylindrical vessel containing a conically shaped bottom 111. A circular grid plate 112 is located in a horizontal position within the bottom of the reactor at a place where the conical shaped bottom is connected to the straight sides of the reactor vessel. The naphtha feed is introduced at the bottom of the reactor through a distributor 113 which is connected to a naphtha supply line 114. This naphtha distributor is positioned about 4 feet above the level of the grid plate. Hot recycle gas is charged into the bottom of the reactor below the grid plate through a line 115. This recycle gas stream supplies the heat of reaction for the reforming treatment. The reactant gaseous materials pass upwardly through the reactor at a velocity which is sufficient to form a dense bed of catalytic solids having a level 117. The reaction product thus formed is passed through a cyclone separator 118 wherein any entrained solids in the gas stream are separated and returned to the reactor bed through a dipleg 119. The separated gaseous product leaves the cyclone through a valved line 121 located outside the reactor proper. Regenerated catalyst is introduced at the top of the reactor bed by means of a riser tube 124 which extends in vertical position through the entire length of the reactor bed. This riser tube is connected to a lift vessel 125 of enlarged cross-sectional area which is located outside of the reactor proper. The cross-sectional area of the lift vessel is gradually reduced to the diameter of the riser so that little turbulence occurs by reason of the restriction. The regenerated catalyst is fed into the lift vessel by means of a transfer line 127 which is connected thereto. This transfer line is in turn connected to the regenerator (not shown). The rate of flow of solids in the transfer line or standpipe is automatically controlled by means of a slide valve 128 which is installed therein. The catalyst flowing in the standpipe is maintained in a fluidized condition by means of aeration gases which are supplied through a supply line 130 at a point just above the slide valve in the standpipe. The catalyst flowing through the standpipe enters the lift vessel wherein recycle gas passes upwardly at a velocity of about 0.1 to 2 feet per second. These recycle gases are charged to the bottom of the lift vessel by means of a line 132.

The difference in the process and apparatus illustrated in Figure 3 over what is shown in Figure 1 resides in the use of an external stripper. As previously indicated, as a result of the hydroforming reaction, a carbonaceous material is deposited on the catalyst causing a decline in catalyst activity. In order to restore the activity of the catalyst, it is regenerated by means of an oxygen-containing gas which burns part or all of the carbonaceous material. A continuous withdrawal of catalyst from the reactor is accomplished by means of a transfer line 134 which is connected to the upper part of the reactor bed. The catalyst flows through a well 135 which is formed by a vertical transverse baffle 136. The catalyst flowing through this well is passed by means of standpipe or transfer line 134 into a stripper vessel. The stripper consists of two sections, namely, a lower section 137 having a diameter of 8 inches and a length of about 24 feet, and an upper section 138 which is superimposed on the lower section and has a diameter of about 18 inches and a length of 10 feet. The standpipe 134 is connected to the stripper at about the middle portion of the lower section 137. This lower section of the stripper contains an internal, vertical baffle plate 140 which extends from a position of 2 feet above the bottom of the stripper to about 2 feet below the end of the lower section 137. This baffle plate divides the lower section 137 into two vertical half sections so that catalyst flowing into the stripper in a transverse direction to the baffle plate must flow upwardly and downwardly around the ends of the baffle plate in order to leave the stripper through a standpipe 142 which is connected to the other side of the stripper in an opposite position to standpipe 134. Stripping gas, such as for example, steam, air, recycled gas, flue gas, nitrogen, carbon dioxide, is fed into the bottom end of the stripper through a supply line 143. In the lower half of section 137 of the stripper below standpipe 134, the incoming catalyst will flow downwardly and countercurrently to the flow of stripping gas and then it will flow concurrently therewith; whereas in the upper half of this section, the incoming spent catalyst will first flow concurrently with the stripping gas and then countercurrently thereto in leaving the stripper. This type of an arrangement provides simultaneous countercurrent and concurrent stripping. In operating the stripper, a level of catalyst is maintained above section 137 or in the bottom of section 138 represented as line 145. The stripping gases are disengaged or separated from any entrained catalyst by means of cyclone 146 which is situated in the upper part of section 138 of the stripper. The separated catalyst in this cyclone is returned to the catalyst by means of dipleg 147. The separated gases are passed from the stripper by means of a valved line 148 and later join the reaction product leaving the reactor in a common header 149.

In each of the specific embodiments illustrated in Figures 1, 2 and 3, the gas employed as a carrying means for the regenerated catalyst is disengaged therefrom at the top of the catalyst bed in the reactor. The disengaged gaseous material does not commingle with any of the reactant materials in the catalyst bed. This feature is advantageous because it provides a means of substantially eliminating any possibility of the regeneration gases which are occluded in the regenerated catalyst stream from having an adverse effect upon the hydrocarbon conversion reaction. Further, the disengaged gaseous materials commingle with the gaseous reaction product above the reactor bed and thereby serve to minimize any thermal cracking which tends to occur at the top of the reactor above the bed of catalyst. The principal cause for the reduction in thermal cracking of the reaction product in the disengaging zone above the reactor bed is the lowering of partial pressure or dilution of the product.

Having thus described my invention by furnishing specific illustrations, it should be understood that no undue limitations or restrictions should be imposed by reason thereof.

I claim:

1. A process which comprises introducing gaseous reactants substantially free of finely divided solids into the lower part of a mass of finely divided catalytic solids in a reaction zone thus forming an elongated dense fluid bed and thereby producing a reaction product and contaminating the catalyst with volatile and non-volatile combustible material, withdrawing a portion of catalyst from the upper part of the dense bed in the reaction zone and passing same as a dense phase into a stripping zone wherein the catalyst is contacted with a gas which serves to remove the volatile combustible material therefrom, passing the stripped catalyst as a dense phase into a regeneration zone wherein at least part of the combustible material on catalyst is removed by burning by the introduction therein of a separate stream of oxygen-containing gas, and passing the regenerated catalyst as a dense phase into an elongated confined zone wherein the catalyst is conveyed upwardly as a relatively lean phase by means of a gas and discharged into the upper part of the catalyst bed in the reaction zone.

2. A process which comprises introducing gaseous reactants substantially free of finely divided solids into the lower part of a mass of finely divided catalytic solids in a reaction zone thus forming an elongated dense fluid bed and thereby producing a reaction product and contaminating the catalyst with volatile and non-volatile combustible material, withdrawing a portion of catalyst from the upper part of the dense bed in the reaction zone and passing same as a dense phase into a stripping zone wherein the catalyst is contacted with a gas which serves to remove the volatile combustible material therefrom, passing the stripped catalyst as a dense phase into a regeneration zone wherein at least part of the combustible material on catalyst is removed by burning by the introduction therein of a separate stream of oxygen-containing gas, and passing the regenerated catalyst as a dense phase into an elongated confined zone wherein the catalyst is conveyed upwardly as a relatively lean phase by means of a gas and discharged above the dense bed in the reaction zone whereby the catalyst is first disengaged from the gaseous material and then combines with the fluid bed in the reaction zone at a position above the point of withdrawal of catalyst from the dense bed.

3. A process which comprises introducing gaseous reactants substantially free of finely divided solids into the lower part of a mass of finely divided catalytic solids in a reaction zone thus forming an elongated dense fluid bed and thereby producing a reaction product and contaminating the catalyst with volatile and non-volatile combustible material, withdrawing a portion of catalyst from the upper part of the dense bed in the reaction zone and passing same as a dense phase into a stripping zone wherein the catalyst is contacted with a gas which serves to remove the volatile combustible material therefrom, passing the stripped catalyst as a dense phase into a regeneration zone wherein at least part of the combustible material on catalyst is removed by burning by the introduction therein of a separate stream of oxygen-containing gas, passing the regenerated catalyst as a dense phase into an elongated confined zone wherein the catalyst is conveyed upwardly as a relatively lean phase by means of a gas, passing the upflowing catalyst into a holding zone wherein the gaseous material contacts the catalyst for an additional period and then is disengaged therefrom, and passing the disengaged catalyst downwardly into a second elongated confined zone whereby the catalyst is discharged into the dense bed in the reaction zone at a point below the point of withdrawal of catalyst therefrom.

4. A reforming process which comprises introducing gaseous reactants substantially free of finely divided solids into the lower part of a mass of finely divided molybdenum oxide catalyst in a reaction zone thus forming an elongated dense fluid bed and thereby producing a reaction product and contaminating the molybdenum oxide catalyst with volatile and non-volatile combustible material, withdrawing a portion of catalyst from the upper part of the dense bed in the reaction zone and passing same as a dense phase into a stripping zone wherein the catalyst is contacted with a gas which serves to remove the volatile combustible material therefrom, passing the stripped catalyst as a dense phase into a regeneration zone wherein at least part of the combustible material on catalyst is removed by burning by the introduction therein of a separate stream of oxygen-containing gas, and passing the regenerated catalyst as a dense phase into an elongated confined zone wherein the catalyst is conveyed upwardly as a relatively lean phase by means of a hydrogen-containing gas to the upper part of the catalyst bed in the reaction zone.

5. A reforming process which comprises introducing gaseous reactants substantially free of finely divided solids into the lower part of a mass of finely divided molybdenum oxide catalyst in a reaction zone thus forming an elongated dense fluid bed and thereby producing a reaction product and contaminating the catalyst with volatile and non-volatile combustible material, withdrawing a portion of catalyst from the upper part of the dense bed in the reaction zone and passing same as a dense phase into a stripping zone wherein the catalyst is contacted with a gas which serves to remove the volatile combustible material therefrom, passing the stripped catalyst as a dense phase into a regeneration zone wherein at least part of the combustible material on catalyst is removed by burning by the introduction therein of a separate stream of oxygen-containing gas, and passing the regenerated catalyst as a dense phase into an elongated confined zone wherein the catalyst is conveyed upwardly as a relatively lean phase by means of a hydrogen-containing gas and discharged above the dense bed in the reaction zone whereby the catalyst is first disengaged from the gaseous material and then combines with the fluid bed in the reaction zone at a position above the point of withdrawal of catalyst from the dense bed.

6. A reforming process which comprises introducing gaseous reactants substantially free of finely divided solids into the lower part of a mass of finely divided molybdenum oxide catalyst in a reaction zone thus forming an elongated dense fluid bed and thereby producing a reaction product and contaminating the catalyst with a volatile and non-volatile combustible material, withdrawing a portion of catalyst from the upper part of the dense bed in the reaction zone and passing same as a dense phase into a stripping zone wherein the catalyst is contacted with a gas which serves to remove the volatile material therefrom, passing the stripped catalyst as a dense phase into a regeneration zone wherein at least part of the combustible material is removed by burning by the introduction therein of a separate stream of oxygen-containing gas, passing the regenerated catalyst as a dense phase into an elongated confined zone wherein the catalyst is conveyed upwardly as a relatively lean phase by means of a hydrogen-containing gas, passing the upflowing catalyst into a holding zone wherein the hydrogen-containing gas first contacts the catalyst for an additional period and then becomes disengaged therefrom, and passing the disengaged catalyst downwardly into a second elongated confined zone whereby the catalyst is discharged into the dense bed in the reaction zone at a point below the point of withdrawal of catalyst therefrom.

7. An apparatus comprising in combination a reactor means, a porous means disposed within the bottom part of said reactor means, a hydrocarbon reactant inlet means situated at the bottom part of the reactor means above the location of the porous means, an elongated upflow means disposed vertically within said reactor means and adapted to introduce finely divided solids into the upper part of said reactor means, means whereby gases are discharged from the top of said reactor means, a stripping means wherein the solids are contacted with a stripping gas, means whereby solids are withdrawn from the reactor means and passed into the stripping means, a stripping gas inlet means whereby stripping gas is introduced into said stripping means, means whereby gases are discharged from top part of said stripping means, a regenerator means situated to the side of said reactor means wherein solids are regenerated by means of burning, means whereby stripped solids are passed from the stripping means to the regenerator means, and means whereby solids are passed from the regenerator means to said elongated upflow means.

8. An apparatus comprising in combination a vertical cylindrical reaction vessel, a porous means disposed within the bottom part of said reaction vessel, a hydrocarbon reactant inlet means situated at the bottom part of the reaction vessel above the location of the porous means, an elongated vertical cylindrical stripping vessel situated along the inside wall of said reaction vessel at the upper part thereof, a stripper inlet means whereby finely divided solids may pass from the reaction vessel into said stripping vessel, a stripping gas inlet means whereby stripping gas contacts solids within said stripping vessel, the lower end of said stripping vessel adapted to discharge solids therefrom, the upper end of said stripping vessel adapted to discharge gaseous materials into the top of said reaction vessel, a vertical cylindrical lift vessel situated below said reaction vessel, means whereby finely divided solids pass into said lift vessel, gas inlet means whereby a gas is introduced into the bottom of said lift vessel, and an elongated vertical conduit communicating with said lift vessel and extending within said reaction vessel to the upper part thereof and whereby solids and gaseous material are discharged into the top of said reaction vessel.

9. An apparatus comprising in combination a vertical cylindrical reaction vessel, a porous means disposed within the bottom part of said reaction vessel, a hydrocarbon reactant inlet means situated at the bottom part of the reactant vessel above the location of the said porous means, an elongated vertical cylindrical stripping vessel situated along the inside wall of the upper part of said reaction vessel a stripper inlet means whereby finely divided solids pass from the reaction vessel into said stripping vessel, a stripping gas inlet means whereby a stripping gas is passed into said stripping vessel, the lower end of said stripping vessel adapted to discharge solids therefrom, the upper end of said stripping vessel adapted to discharge gaseous material into the top of said vessel, a vertical cylindrical lift vessel disposed below said reaction vessel, means whereby solids are introduced into said lift vessel, means whereby a gas is introduced into the bottom part of said lift vessel, an elongated vertical conduit communicating with said lift vessel and extending to the top part of the inside of said reaction vessel, a vertical cylindrical holding vessel disposed within the upper part of said reaction vessel and communicating with said elongated vertical conduit, and a second vertical elongated conduit depending from said holding vessel whereby solids are discharged into the middle section of said reaction vessel.

10. An apparatus comprising in combination a vertical cylindrical reaction vessel, a porous means disposed within the bottom part of said reaction vessel, a hydrocarbon reactant inlet means situated at the bottom part of the reaction vessel above the location of the porous means, a separate vertical cylindrical stripping vessel, means whereby finely divided solids are withdrawn from the upper part of the reaction vessel and flow into the middle portion of said stripping vessel, a vertical transverse baffle situated within said stripping vessel whereby the stripper is divided into two vertical elongated zones which communicate with each other at the bottom and top sections of the stripping vessel, means whereby a stripping gas is introduced into the bottom part of the stripping vessel, means whereby solids are withdrawn from the middle section of the stripping vessel from the side opposite to the stripper inlet means, a vertical cylindrical lift vessel disposed below said reaction vessel, means whereby finely divided solids are introduced into said lift vessel, gas inlet means whereby a gas is introduced into the bottom part of said lift vessel and an elongated vertical conduit communicating with said lift vessel and extending to the upper part of the inside of the reaction vessel.

11. A hydroforming process which comprises introducing gaseous reactants substantially free of finely divided solids into the lower part of a mass of finely divided molybdenum oxide catalyst in a reaction zone thus forming an elongated dense fluid bed and thereby producing a reaction product and contaminating the catalyst with volatile and non-volatile combustible material, withdrawing a portion of the catalyst from the upper part of the dense bed in the reaction zone and passing the same as a dense phase to a separate elongated stripping zone wherein the catalyst is contacted with a gas which serves to remove the volatile combustible material therefrom, combining directly the stripping zone effluent with the reaction product without contacting the catalyst bed in the reaction zone, passing the stripped catalyst as a dense phase to a regeneration zone wherein at least part of the combustible material is removed by burning by the introduction therein of a separate stream of oxygen-containing gas, passing the regenerated catalyst as a dense phase to an elongated confined zone wherein the catalyst is conveyed upwardly as a relatively lean phase by means of a hydrogen-containing gas to the upper part of the catalyst bed in the reaction zone.

12. A hydroforming process which comprises introducing gaseous reactants substantially free of finely divided solids into the lower part of a mass of finely divided molybdenum oxide catalyst in a reaction zone thus forming an elongated dense fluid bed and thereby producing a reaction product and contaminating the catalyst with volatile and non-volatile combustible material, withdrawing a portion of catalyst from the upper part of the dense bed in the reaction zone and passing the same as a dense phase to a stripping zone wherein the catalyst is contacted with a gas which serves to remove the volatile combustible material therefrom, passing the stripped catalyst as a dense phase to a regeneration zone wherein at least part of the combustible material is removed by burning by the introduction therein of a separate stream of oxygen-containing gas, passing the regenerated catalyst as a dense phase to a lifting zone wherein the catalyst is maintained as a dense phase, passing a hydrogen-containing gas through the lifting zone in order to reduce the regenerated catalyst and to suspend a portion thereof for conveyance upwardly through an elongated narrow confined zone wherein the suspension of catalyst is in a relatively lean phase, disengaging the catalyst from the hydrogen-containing gas, passing the disengaged catalyst to the top part of the reaction zone, and removing the separated hydrogen-containing gas from the upper part of the reaction zone without contacting the catalyst bed therein.

13. A hydroforming process which comprises introducing gaseous reactants substantially free of finely divided solids into the lower part of a mass of finely divided molybdenum oxide catalyst in a reaction zone thus forming an elongated dense fluid bed and thereby producing a reaction product and contaminating the catalyst with volatile and non-volatile combustible material, withdrawing a portion of catalyst from the upper part of the dense bed in the reaction zone and passing the same as a dense phase to a separate elongated stripping zone wherein the catalyst is contacted with a gas which serves to remove the volatile combustible material therefrom, combining directly the stripping zone effluent with the reaction product without contacting the catalyst bed in the reaction zone, passing the stripped catalyst as a dense phase to a regeneration zone wherein at least part of the combustible material is removed by burning by the introduction therein of a separate stream of oxygen-containing gas, passing the regenerated catalyst as a dense phase to a lifting zone wherein the catalyst is maintained as a dense phase, passing a hydrogen-containing gas through a lifting zone in order to reduce the regenerated catalyst and to suspend a portion thereof for conveyance upwardly through an elongated narrow confined zone in which the gaseous suspension of catalyst is in a relatively lean phase, disengaging the catalyst from the hydrogen-containing gas, passing the disengaged catalyst to the top part of the reaction zone, and removing the separated hydrogen-containing gas from the upper part of the reaction zone without contacting the catalyst bed therein.

References Cited in the file of this patent

UNITED STATES PATENTS

| Number | Name | Date |
|---|---|---|
| 2,410,891 | Meinert et al. | Nov. 12, 1946 |
| 2,446,247 | Scheineman | Aug. 3, 1948 |
| 2,488,030 | Scheineman | Nov. 15, 1949 |
| 2,562,225 | Wickham et al. | July 31, 1951 |
| 2,585,238 | Gerhold | Feb. 12, 1952 |
| 2,629,684 | Leffer | Feb. 24, 1953 |